No. 797,858. PATENTED AUG. 22, 1905.
L. R. LEWIS.
CREAM SEPARATOR.
APPLICATION FILED MAR. 6, 1905.
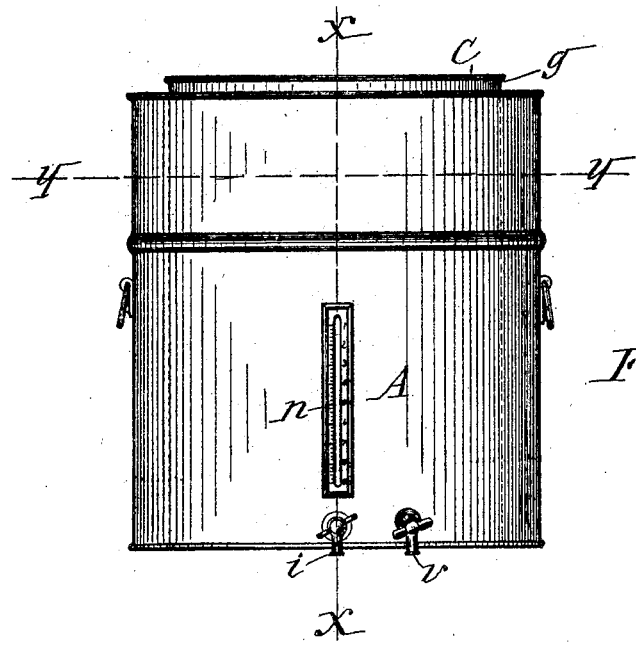
Fig. 1
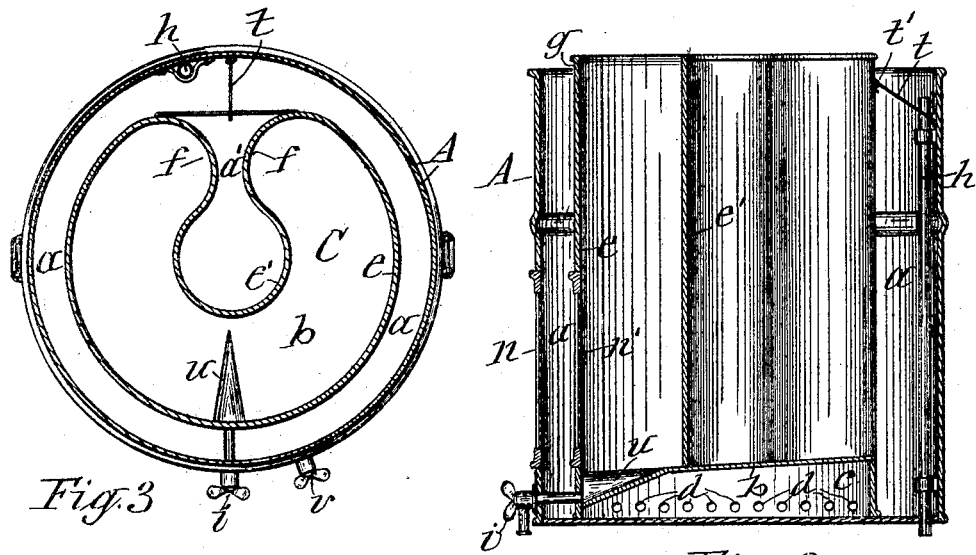
Fig. 3
Fig. 2
WITNESSES:
INVENTOR
Lynn R. Lewis
By E. Laass
his ATTORNEY.

UNITED STATES PATENT OFFICE.

LYNN R. LEWIS, OF CORTLAND, NEW YORK.

CREAM-SEPARATOR.

No. 797,858.        Specification of Letters Patent.        Patented Aug. 22, 1905.

Application filed March 6, 1905. Serial No. 248,495.

*To all whom it may concern:*

Be it known that I, LYNN R. LEWIS, of Cortland, in the county of Cortland, in the State of New York, have invented new and useful Improvements in Cream-Separators, of which the following, taken in connection with the accompanying drawings, is a full, clear, and exact description.

This invention relates to the class of cream-separators termed "gravity-separators," in which the can containing the creamy milk is set into a tank charged with cold water to chill the milk and increase the density thereof, so as to force the cream to the surface of the milk, the milk and supernatant stratum of cream being subsequently withdrawn separately through a faucet tapping the bottom of the can.

It is a well-known fact that among the desiderata and important requirements of every well-conducted dairy is cleanliness of all vessels employed for containing the milk, and therefore such vessels should be of a shape which permits the vessel to be thoroughly, conveniently, and quickly cleansed, especially in the interior thereof. In separating cream from milk in cans set in cooling-water it is essential to expose the milk to a maximum cooling-surface of the can and to subject said surface to free circulation of the water around every portion of the walls and bottom of the can.

The object of my invention is to produce a gravity cream-separator which shall meet all of the said requirements; and to that end the invention consists in the improved construction and combination of the component parts of the cream-separator, as hereinafter described, and set forth in the claims.

In the accompanying drawings, Figure 1 is a side view of a cream-separator embodying my invention. Fig. 2 is a vertical section on line X X in Fig. 1, and Fig. 3 is a transverse section on the line Y Y in Fig. 1.

Similar letters of reference indicate corresponding parts.

A represents the water-tank, in which is set concentric the can C, containing the milk from which the cream is to be separated. The tank A is shaped cylindrical and of ample diameter to receive the milk-can C and form a water-space $a$, extending completely around the exterior of the said can. The wall of the milk-can extends some distance below the bottom $b$ of the can to form a chamber $c$ and is perforated or provided with suitable openings $d\,d$ thereat, which afford communication between the chamber and annular space $a$ to allow the water to circulate under the bottom $b$ of the can, and thus accelerate the cooling of the milk and the resultant rising of the cream to the surface of the milk. To further promote the operation of the cream-separator, I form the milk-can C of two concentric segmental wall portions $e\,e'$ and intermediate reverse curved segmental portions $f\,f$, uniting said wall portions $e\,e'$ and forming a radial water-passage $a'$, which is contracted at its center and widened inward and outward to its communication with the water-space in the inner or central segmental portion $e'$ and the outer water-space $a$, as shown in Fig. 3 of the drawings. The said inner segmental wall portion forms a central water-chamber extending the entire depth of the can. The top of the said milk-can C projects above the top of the tank A, as shown at $g$, to prevent the water from flowing from said tank into the milk-can.

$h$ denotes an overflow-pipe or suitable duct leading from the top of the tank A.

To guard against the lifting of the milk-can from the bottom of the tank A by pressure of the water in said tank, I provide a suitable brace or tie $t$, preferably of the form of a hook, connected to the tank and engaging an eye $t'$ on the side of the can C, as represented in Fig. 2 of the drawings.

$i$ represents a suitable faucet which taps a depression or gutter $u$, formed in the bottom of the can C. The faucet extends through the water-space $a$ and has its discharge end protruding at the exterior of the tank A.

$v$ is a faucet which taps the base of the water-tank to allow the water to be withdrawn from the tank when desired to empty it.

$n\,n$ represent glass-covered vertical slots through which to observe the progress of the separation of the cream from the milk.

When it is found that all the cream is raised to the top of the milk, the operator opens the faucet $i$ to draw off the milk. As soon as it is observed that all the milk has been drawn out of the can C the cream, which has in the meantime descended to the bottom of the can, is drawn through the faucet $i$ into a separate receptacle. The can C thus relieved of its contents is prevented from being lifted by the water in the tank A by the attachment of the faucet $i$ and the brace or tie $t$.

What I claim as my invention is—

1. A cream-separator comprising a cylindrical tank, a milk-can disposed concentrically therein to produce an annular water-space extending completely around the milk-can, said can having its wall extending below the bottom to form a water-chamber thereunder and provided thereat with perforations affording communication between the chamber and water-space, and the bottom inclined in one direction and provided with a gutter of greater inclination, and a faucet tapping the said milk-can at the gutter and extending through the water-space and having its discharge end protruding at the exterior of the tank as set forth.

2. A cream-separator comprising a cylindrical tank, a milk-can disposed concentrically therein to produce an annular water-space extending completely around the milk-can, the wall of said can extending below the bottom thereof to produce a water-chamber under the can and provided with perforations affording communication between the said water space and chamber, a water-chamber disposed concentrically within the milk-can and extending the entire depth thereof and provided with a passage by which it communicates with said annular water-space, the bottom of said milk-can provided with a radial gutter disposed diametrically opposite the said passage and inclined from the wall of the central chamber, and a faucet tapping said gutter and extending through the annular water-space and having its discharge end protruding at the exterior of the tank as set forth.

3. A cream-separator comprising a cylindrical tank, a milk-can seated concentrically therein to produce an annular water-space extending completely around the milk-can, a water-chamber disposed beneath the can and communicating with the annular water-space, an overflow-pipe disposed in said water-space and extending through the bottom of the tank, a discharge-faucet tapping the tank at the bottom of said water-space, the bottom of the milk-can being inclined and formed with a gutter or depression of greater inclination, and a faucet tapping said milk-can at the gutter and extending through the water-space to the exterior of the tank as set forth.

4. In the herein-described cream-separator, the combination of a cylindrical water-tank, a milk-can formed of two concentric segmental wall portions producing an annular water-space completely surrounding the can and producing a central water-chamber extending the entire depth of the can, said wall portions being united by intermediate reverse curved segmental portions producing a radial passage between the central chamber and annular water-space, the bottom of the said milk-can being elevated to form a water-chamber thereunder which communicates with the said annular water-space, and formed with a gutter or depression between the wall portions, and a faucet tapping said milk-can at the gutter and extending through the water-space to the exterior of the tank as set forth and shown.

LYNN R. LEWIS. [L. S.]

Witnesses:
S. K. JONES,
H. J. HARRINGTON.